US012625853B2

(12) United States Patent
Lei et al.

(10) Patent No.: US 12,625,853 B2
(45) Date of Patent: May 12, 2026

(54) METHOD AND SYSTEM FOR PERFORMING HIGH-PERFORMANCE WRITES OF DATA TO COLUMNAR STORAGE

(71) Applicant: Dell Products L.P., Round Rock, TX (US)

(72) Inventors: Lu Lei, Shanghai (CN); Flavio Paiva Junqueira, Barcelona (ES); Jiang Cao, Shanghai (CN); Xia Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/189,868

(22) Filed: Mar. 24, 2023

(65) Prior Publication Data

US 2024/0320201 A1 Sep. 26, 2024

(51) Int. Cl.
G06F 16/22 (2019.01)
G06F 16/172 (2019.01)

(52) U.S. Cl.
CPC .......... G06F 16/221 (2019.01); G06F 16/172 (2019.01)

(58) Field of Classification Search
CPC .............................. G06F 16/221; G06F 16/172
See application file for complete search history.

(56) References Cited

U.S. PATENT DOCUMENTS

| | | | | | |
|---|---|---|---|---|---|
| 5,555,389 | A | * | 9/1996 | Satoh .................... | G06F 3/0611 |
| | | | | | 707/999.203 |
| 8,433,694 | B1 | * | 4/2013 | Eldridge ............... | G06F 16/172 |
| | | | | | 707/705 |
| 10,296,462 | B2 | * | 5/2019 | Loaiza .................... | G06F 16/22 |
| 2009/0125691 | A1 | * | 5/2009 | Nakanishi ........... | G06F 11/2069 |
| | | | | | 718/104 |
| 2011/0087833 | A1 | * | 4/2011 | Jones ................... | G06F 12/0866 |
| | | | | | 711/E12.001 |
| 2016/0077968 | A1 | * | 3/2016 | Sela ..................... | G06F 12/0246 |
| | | | | | 711/118 |
| 2016/0321288 | A1 | * | 11/2016 | Malhotra ............ | G06F 16/1748 |
| 2017/0139830 | A1 | * | 5/2017 | Gupta ................. | G06F 12/0871 |
| 2017/0185645 | A1 | * | 6/2017 | Agarwal ........... | G06F 16/24552 |
| 2018/0329975 | A1 | * | 11/2018 | Brown .................. | G06F 16/221 |

(Continued)

OTHER PUBLICATIONS

Avrilia Floratou, (2018). "Columnar Storage Formats", Encyclopedia of Big Data Technologies, Published by Springer, Retrieved Apr. 5, 2023, from <https://www.microsoft.com/en-us/research/publication/columnar-storage-formats/> (2 pages).

(Continued)

*Primary Examiner* — Ajay M Bhatia
*Assistant Examiner* — Zuheir A Mheir
(74) *Attorney, Agent, or Firm* — Chamberlain, Hrdlicka, White, Williams & Aughtry; Aly Z. Dossa

(57) ABSTRACT

Techniques described herein relate to a method for storing data in columnar storage. The method includes obtaining a columnar storage write request associated with a file, wherein the file comprises rows and columns of file data; in response to obtaining the columnar storage write request: writing the file data to storage using column-based caches; generating file metadata based on the writing of the file data to the storage; and assigning a key to the file metadata; and storing the file metadata using a key-value service.

8 Claims, 6 Drawing Sheets

(56) References Cited

U.S. PATENT DOCUMENTS

| | | | | |
|---|---|---|---|---|
| 2021/0311923 | A1* | 10/2021 | Gohad | ............... G06F 12/0882 |
| 2022/0245094 | A1* | 8/2022 | Jujjuri | ................ G06F 12/0868 |
| 2022/0382758 | A1* | 12/2022 | Schreter | ............. G06F 16/2282 |
| 2023/0305998 | A1* | 9/2023 | Bosch | ................. G06Q 10/103 |
| 2023/0376473 | A1* | 11/2023 | Amler | .................. G06F 16/221 |

OTHER PUBLICATIONS

Apache Parquet., (n.d.). "File Format", Retrieved Apr. 5, 2023, from <https://parquet.apache.org/docs/file-format/_print/> (18 pages).
Gszadovszky et al., (2021). "ColumnIndex Layout to Support Page Skipping", Retrieved Mar. 24, 2023, from <https://github.com/apache/parquet-format/blob/master/PageIndex.md> (3 pages).
Jerolba, (n.d.). "Hadoop integration", Retrieved Mar. 24, 2023, from <https://github.com/apache/parquet-mr/tree/master/parquet-hadoop>, (13 pages).
"The Internals of PostgreSQL for database administrators and system developers" (n.d.), Retrieved Mar. 24, 2023, from <https://www.interdb.jp/pg/pgsql01.html> (5 pages).
Wgtmac et al., (n.d). "apache/parquet-format", Retrieved Mar. 24, 2023, from <https://github.com/apache/parquet-format> (11 pages).

* cited by examiner

300

METHOD AND SYSTEM FOR PERFORMING HIGH-PERFORMANCE WRITES OF DATA TO COLUMNAR STORAGE

BACKGROUND

Computing devices may provide services for users. To provide the services, the computing devices may generate data. The data may be important to users. The data may be stored in storage for later use. The data may be written to the storage using a cache.

SUMMARY

In general, certain embodiments described herein relate to a method for storing data in columnar storage. The method may include obtaining a columnar storage write request associated with a file, wherein the file comprises rows and columns of file data; in response to obtaining the columnar storage write request: writing the file data to storage using column-based caches; generating file metadata based on the writing of the file data to the storage; and assigning a key to the file metadata; and storing the file metadata using a key-value service.

In general, certain embodiments described herein relate to a system for storing data in columnar storage. The system includes a storage for storing data. The system also includes format handler that includes a processor and memory and is programmed to obtain a columnar storage write request associated with a file, wherein the file comprises rows and columns of file data; in response to obtaining the columnar storage write request: write the file data to storage using column-based caches; generate file metadata based on the writing of the file data to the storage; and assign a key to the file metadata; and store the file metadata using a key-value service.

In general, certain embodiments described herein relate to a non-transitory computer readable medium that includes computer readable program code, which when executed by a computer processor enables the computer processor to perform a method for storing data in columnar storage. The method may include obtaining a columnar storage write request associated with a file, wherein the file comprises rows and columns of file data; in response to obtaining the columnar storage write request: writing the file data to storage using column-based caches; generating file metadata based on the writing of the file data to the storage; and assigning a key to the file metadata; and storing the file metadata using a key-value service.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
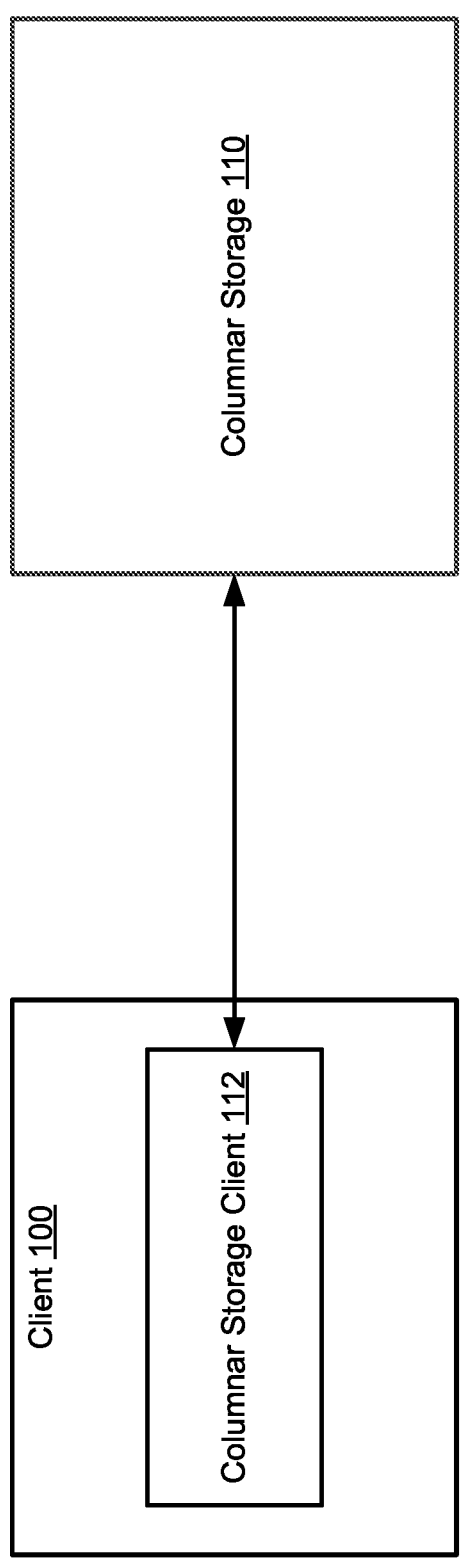
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and non-transitory computer readable mediums for writing data to columnar storage.

In one or more embodiments, files may be structured data. Structured data may be formatted data files, tables, and/or any other type of data stored as a file format that may include rows and columns of data, with each row having a data value in one or more columns. Such files may be written and stored in columnar storage. Columnar storage may stores structured data by column rather than by row. As opposed to row-oriented storage, columnar storage may significantly reduce the amount of data fetched from storage (e.g., disks) by allowing access to only the columns that are relevant for the particular query or workload. Moreover, columnar storage combined with efficient encoding and compression techniques may drastically reduce the storage requirements without sacrificing query performance.

In traditional methods for storing columnar data to storage, although data is stored by columns, file data may be loaded into a cache row by row to be written to storage. When a row is loaded into a cache, the cache may include the data associated with each column corresponding to that row. The cache may be a relatively large cache (e.g., 128 megabytes (MB)). When the cache is full, the cache may be flushed to the storage. The data transfer protocols may be limited in the amount of data that can be flushed in each request, for example 100 MB. So, when the aforementioned cache is full, the data block in the cache would be split into two and written as two separate data blocks that include 100 MB and 28 MB. Once flushed, the cache may be emptied and more rows may be loaded into it. The process may repeat until the entire file is stored in storage. Some storages and storage formats (e.g., Hadoop Distributed File System (HDFS)) may designed for large sequential writes that include up to and exceeding 100 MB. However, other storage architectures (e.g., object storage) may not be configured to adequately handle such large sequential writes. Such storage architectures may configured to perform small concurrent writes of data, such as 1-2 MB data block writes. The small concurrent writes may be performed faster and more efficiently than the large sequential writes.

Embodiments disclosed herein may address, at least in part, the aforementioned issues, by performing writes of data to multiple smaller column-based caches (CBCs) instead of a large single cache. In one or more embodiments, data may be loaded into the CBCs row by row, as discussed above. However, each CBC of the CBCs may be associated with a particular column of a file. When a row is loaded into the CBCs, each column's data is loaded into the corresponding CBC. Each CBC may be significantly smaller than the traditional cache discussed above. For example, the CBCs may include 1 MB capacities instead of the 128 MB capacity of the single cache used in traditional columnar storages. In one or more embodiments, each CBC is handled independently. When one CBC is full, a format handler (discussed below in paras. [0041]-[0044]) may flush the data of the full CBC without waiting for the other CBCs to be filled. As a result, file data may be written concurrently to the storages of the columnar storage as 1 MB data blocks instead of sequentially as 100 MB data blocks, thereby improving the speed, performance, and efficiency of writes of data to the columnar storage.

Figure 1B:
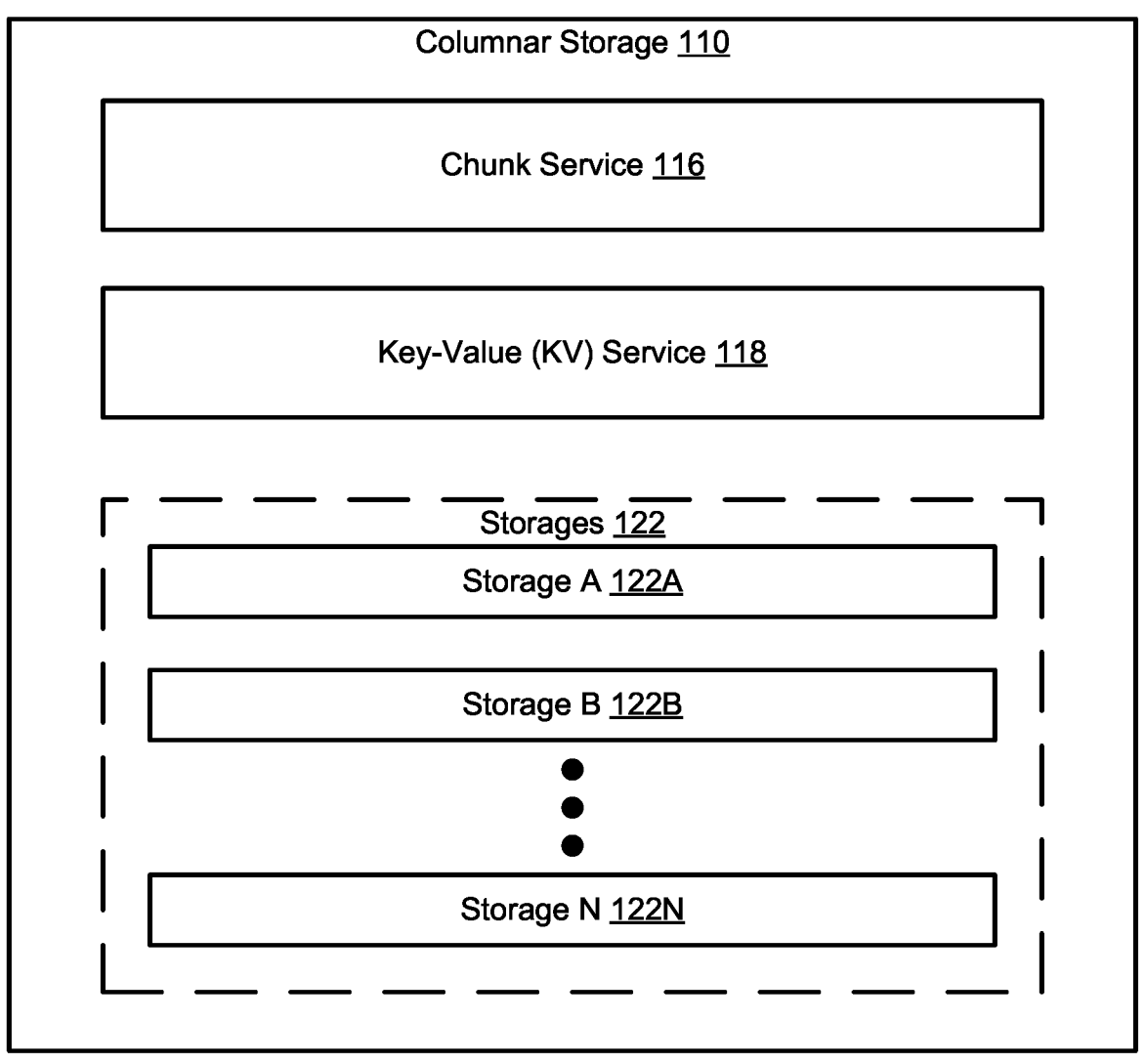
FIG. 1B shows a diagram of a columnar storage in accordance with one or more embodiments disclosed herein.
Figure 1C:
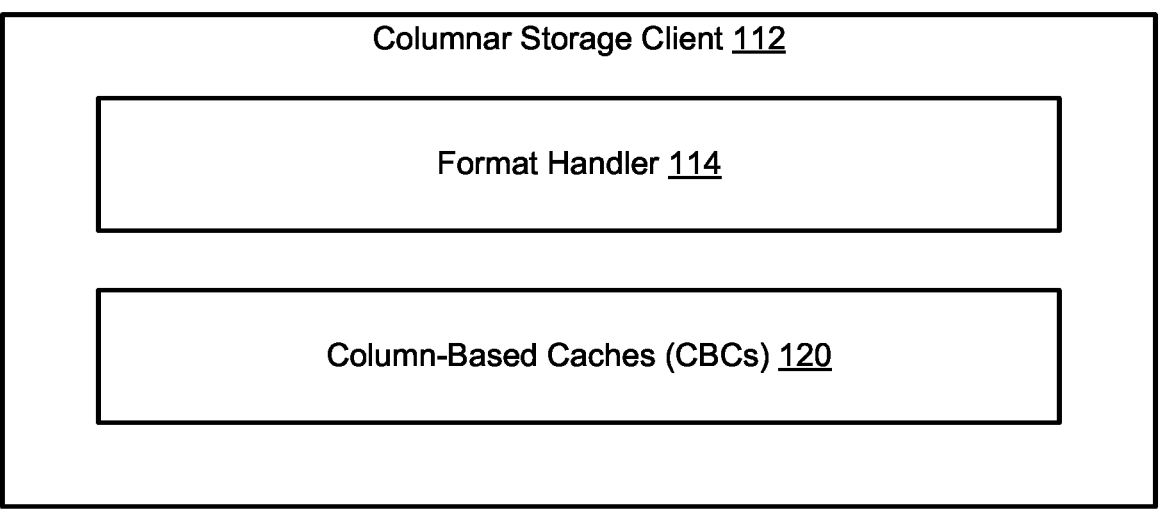
FIG. 1C shows a diagram of a columnar storage client in accordance with one or more embodiments disclosed herein.

FIG. 1A shows a diagram a system in accordance with one or more embodiments disclosed herein. The system may include a client (100), a columnar storage client (112), and a columnar storage (110). The components of the system illustrated in FIG. 1A and/or components therein, as shown in FIGS. 1B-1C, may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the client (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (100) described herein and/or all, or a portion, of the methods illustrated in FIGS. 2A-2B. The client (100) may be implemented using other types of computing devices without departing from the embodiments disclosed herein. For additional details regarding computing devices, refer to FIG. 3.

The client (100) may be implemented using logical devices without departing from the embodiments disclosed herein. For example, the client (100) may include virtual machines that utilize computing resources of any number of physical computing devices to provide the functionality of the client (100). The client (100) may be implemented using other types of logical devices without departing from the embodiments disclosed herein.

In one or more embodiments, the client (100) may include the functionality to, or otherwise be programmed or configured to, obtain columnar storage services for users of the client (100). To obtain the columnar storage services, the client (100) may include a columnar storage client (112) with the functionality to send and/or receive data or requests to or from the columnar storage (110). The client (100) may include the functionality to perform all, or a portion of, the methods discussed in FIGS. 2A-2B. The client (100) may include other and/or additional functionalities or components without departing from embodiments disclosed herein. For additional information regarding the columnar storage client (112), refer to FIG. 1C. For additional information regarding the functionality of the client (100), refer to FIGS. 2A-2B.

In one or more embodiments disclosed herein, the columnar storage client (112) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the columnar storage client (112) described throughout this Detailed Description.

In one or more embodiments disclosed herein, the columnar storage client (112) is implemented as computer instructions, e.g., computer code, stored on a storage (e.g., 122A) that when executed by a processor of the client (100, FIG. 1A) causes the client (100, FIG. 1A) to provide the functionality of the columnar storage client (112) described throughout this Detailed Description.

In one or more embodiments, the columnar storage client (112) may include the functionality to perform a portion of the aforementioned columnar storage services of the client (100, FIG. 1A). If the client (100, FIG. 1A) or another entity not illustrated in the system of FIG. 1A requires storing data in the columnar storage (110, FIG. 1A), it may require connection to, or installation or instantiation of, the columnar storage client (112). The portion of the aforementioned columnar storage services performed by the columnar storage client (112) may include obtaining write requests and data from the client (100, FIG. 1A) or a user of the client (100, FIG. 1A). The portion of the aforementioned columnar storage services may further include obtaining read requests and sending data and/or portions of data stored in the storages (122). The portion of the aforementioned columnar storage services may further include initiating the performance of the remainder of the columnar storage services from the format handler (discussed below in paras. [0041]-

[0044]), the chunk service (discussed below in paras. [0032]-[0035]), and/or the KV service (discussed below in paras. [0036]-[0038]) in response to obtaining the read requests and/or write requests. The columnar storage client (112) may perform all, or a portion, of the methods discussed in FIGS. 2A-2B. For additional information regarding the functionality of the columnar storage client (112), refer to FIGS. 2A-2B. The columnar storage client (112) may include other and/or additional functionalities without departing from embodiments disclosed herein. For additional information regarding the columnar storage client (112), refer to FIG. 1C.

In one or more embodiments, the columnar storage (110) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2B. The columnar storage (110) may be implemented using other types of computing devices without departing from embodiments disclosed herein. For additional details regarding computing devices, refer to FIG. 3.

In one or more embodiments, the columnar storage (110) may be implemented using logical devices without departing from embodiments disclosed herein. For example, the columnar storage (110) may include virtual machines that utilize computing resources of any number of physical computing devices to provide the functionality of the columnar storage (110). The columnar storage (110) may be implemented using other types of logical devices without departing from the embodiments disclosed herein.

In one or more embodiments, the columnar storage (110) may include the functionality to, or may be otherwise programmed or configured to, perform columnar storage services for the user of the client (100). The columnar storage services may include: (i) obtaining columnar data from the client (100), (ii) generating data blocks using the columnar data, (iii) writing the data blocks to storages using column based caches, and (iv) generating and maintaining metadata associated with the columnar data. The columnar storage services may include other and/or additional services (e.g., retrieving data blocks from storage using metadata to service read requests) without departing from embodiments disclosed herein. The columnar storage (110) may include other and/or additional functionalities without departing from embodiments disclosed herein. For additional information regarding the columnar storage (110) refer to FIG. 1B.

Although the system of FIG. 1A is shown as having a certain number of components (e.g., 100, 110), in other embodiments disclosed herein, the system may have more or fewer components. For example, the functionality of each component described above may be split across components or combined into a single component. Further still, each component may be utilized multiple times to carry out an iterative operation.

FIG. 1B shows a diagram of a columnar storage in accordance with one or more embodiments disclosed herein. The columnar storage (110) may be an embodiment of the columnar storage (110, FIG. 1A) discussed above. As discussed above, the columnar storage (110) may include the functionality to perform columnar storage services. To perform the aforementioned services, the columnar storage (110) may include a columnar storage client (112), a format handler (114), a chunk service (116), a key-value (KV) service, CBCs (120), and storages (122). The columnar storage (110) may include other, additional, and/or fewer components without departing from embodiments disclosed herein. Each of the aforementioned components of the columnar storage (110) is discussed below.

In one or more embodiments, the chunk service (116) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the chunk service (116) described throughout this Detailed Description.

In one or more embodiments disclosed herein, the chunk service (116) is implemented as computer instructions, e.g., computer code, stored on a storage (e.g., 122A) that when executed by a processor of the columnar storage (110) causes the columnar storage (110) to provide the functionality of the chunk service (116) described throughout this Detailed Description.

In one or more embodiments, the chunk service (116) may include the functionality to perform a portion of the aforementioned columnar storage services of the columnar storage (110). The portion of the aforementioned columnar storage services performed by the chunk service (116) may include managing data blocks written by the format handler (discussed below in paras. [0041]-[0044]) as chunks. The chunk service (116) may obtain a data block when the format handler (discussed below in paras. [0041]-[0044]) flushes the data block in a full cache. A data block may refer to a sequence of physically adjacent bytes of data associated with one or more row data values of a particular column. Each data block may include any amount of data (e.g., 1 MB, 2 MB, 100 MB, etc.) without departing from embodiments disclosed herein. A chunk may refer to a logical abstraction of a physical data block. The chunk service (116) may assign each obtained data block a chunk identifier that may be used to identify, obtain, or otherwise manage a particular chunk. As used herein, a chunk identifier may refer to a unique combination of alphabetic characters and/or numeric characters that are associated with a particular data block.

The chunk service (116) may generate or obtain a storage location associated with each chunk stored in the storages (122). The storage location may be, for example, a storage identifier, a pointer, and/or an offset. As used herein, a storage identifier may refer to a unique combination of alphabetic characters and/or numeric characters that are associated with a particular data block. The storage location may include other and/or additional information that may be used to specify the physical location of the data block stored in the storages (122) without departing from embodiments disclosed herein. The chunk service (116) may perform all, or a portion, of the methods discussed in FIGS. 2A-2B. For additional information regarding the functionality of the chunk service (116), refer to FIGS. 2A-2B. The chunk service (116) may include other and/or additional functionalities without departing from embodiments disclosed herein.

In one or more embodiments, the KV service (118) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the KV service (118) described throughout this Detailed Description.

In one or more embodiments disclosed herein, the KV service (118) is implemented as computer instructions, e.g., computer code, stored on a storage (e.g., 122A) that when executed by a processor of the columnar storage (110) causes the columnar storage (110) to provide the functionality of the KV service (118) described throughout this Detailed Description.

In one or more embodiments, the KV service (118) may include the functionality to perform a portion of the aforementioned columnar storage services of the columnar storage (110). The portion of the aforementioned columnar storage services performed by the KV service (118) may include managing or otherwise maintaining a key-value (KV) store. A key-value store may refer to one or more data structures that include keys and values. Each key in the KV store may be associated with a corresponding value. The KV store may include other and/or additional information without departing from embodiments disclosed herein. In one or more embodiments, each key in the KV store may include a file name associated with the metadata file and the corresponding value may include the metadata file associated with the file name. As used herein, a file name may refer to a unique combination of alphabetic characters and/or numeric characters that are associated with a particular file. Each file written to the storages may include a corresponding metadata file stored in the KV store. The KV service (118) may use the KV store and the metadata files within to query, or retrieve, all or a portion, of the data chunks associated with the file that are stored in the storage (122). The KV store may be stored in memory of the KV service (118) or in the storages (122). The KV service (118) may perform all, or a portion, of the methods discussed in FIGS. 2A-2B. For additional information regarding the functionality of the KV service (118), refer to FIGS. 2A-2B. The KV service (118) may include other and/or additional functionalities without departing from embodiments disclosed herein.

In one or more embodiments, the storages (122) may be implemented using one or more volatile or non-volatile storages or any combination thereof. The storages may include any quantity of storages without departing from embodiments disclosed herein. For example, the storages may include storage A (122A), storage B (122B), and storage N (122N). The storages (122) may include the functionality to, or otherwise be configured to, store and provide all, or portions of, data chunks of files that may later be used by the client (100, FIG. 1A) and/or a user of the client (100, FIG. 1A). The format handler (discussed below in paras. [0041]-[0044]) and/or the chunk service (116) may write and/or read data from the storages (122). The storage may include other and/or additional information and/or functionalities without departing from embodiments disclosed herein.

While the data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein.

Additionally, while discussed as being stored in the storages (122), any of the aforementioned data structures may be stored in different locations (e.g., in storage of other computing devices) and/or spanned across any number of computing devices without departing from embodiments disclosed herein. Any of the data structures discussed herein may be implemented as tables, lists, linked lists, files, file systems, databases, etc.

FIG. 1C shows a diagram of a columnar storage client in accordance with one or more embodiments disclosed herein. The columnar storage client (112) may be an embodiment of the columnar storage client (112, FIG. 1A) discussed above. As discussed above, the columnar storage client may include the functionality to send and/or receive data or requests to or from the columnar storage (110). To provide the aforementioned functionality the, columnar storage client (112) may include a format handler (114) and column-based caches (CBCs) (120). The columnar storage client (112) may include other, additional, or fewer components without departing from embodiments disclosed herein. Each of the aforementioned components of the columnar storage client (112) is discussed below.

In one or more embodiments, the format handler (114) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the format handler (114) described throughout this Detailed Description.

In one or more embodiments disclosed herein, the format handler (114) is implemented as computer instructions, e.g., computer code, stored on a storage (e.g., 122A) that when executed by a processor of the client (100, FIG. 1A) causes the client (100, FIG. 1A) to provide the functionality of the format handler (114) described throughout this Detailed Description.

In one or more embodiments, the format handler (114) may include the functionality to perform a portion of the aforementioned columnar storage services of the columnar storage (110). The portion of the aforementioned columnar storage services performed by the format handler (114) may include using column-based caches (e.g., 120) to write columnar data to the storages (122). The format handler (114) may instantiate, remove, or otherwise maintain multiple caches to perform the writes of columnar data to the storages (122). The format handler (114) may, when full, independently flush the data of each column-based cache to the storages (122). The columnar data may be associated with any columnar data format (e.g., parquet, ORC, etc.) without departing from embodiments disclosed herein. The format handler (114) may perform all, or a portion, of the methods discussed in FIGS. 2A-2B. For additional information regarding the functionality of the format handler (114), refer to FIGS. 2A-2B. The format handler (114) may include other and/or additional functionalities without departing from embodiments disclosed herein.

In one or more embodiments, the column-based caches (CBCs) (120) may refer to one or more hardware storages or portions of hardware storages that store limited amounts of temporary data that may be retrieved faster than data stored on other storages (e.g., 122) such as main memory or secondary storage. The CBCs (120) may include any quantity of caches without departing from embodiments disclosed herein. The CBCs (120) may include any appropriate type of cache (e.g., CPU cache, disk cache, flash cache, RAM cache, etc.) without departing from embodiments disclosed herein. The CBCs (120) may be used by the format handler (114) to perform writes of columnar data to the storages (122). The format handler (114) may load data into the CBCs (120), flush data from the CBCs (120), and clear the CBCs (120). The CBCs may include a small capacity of data such as 1 or 2 MB to enable high-performance concurrent writes of small data blocks to the storages (122).

Figure 2A:
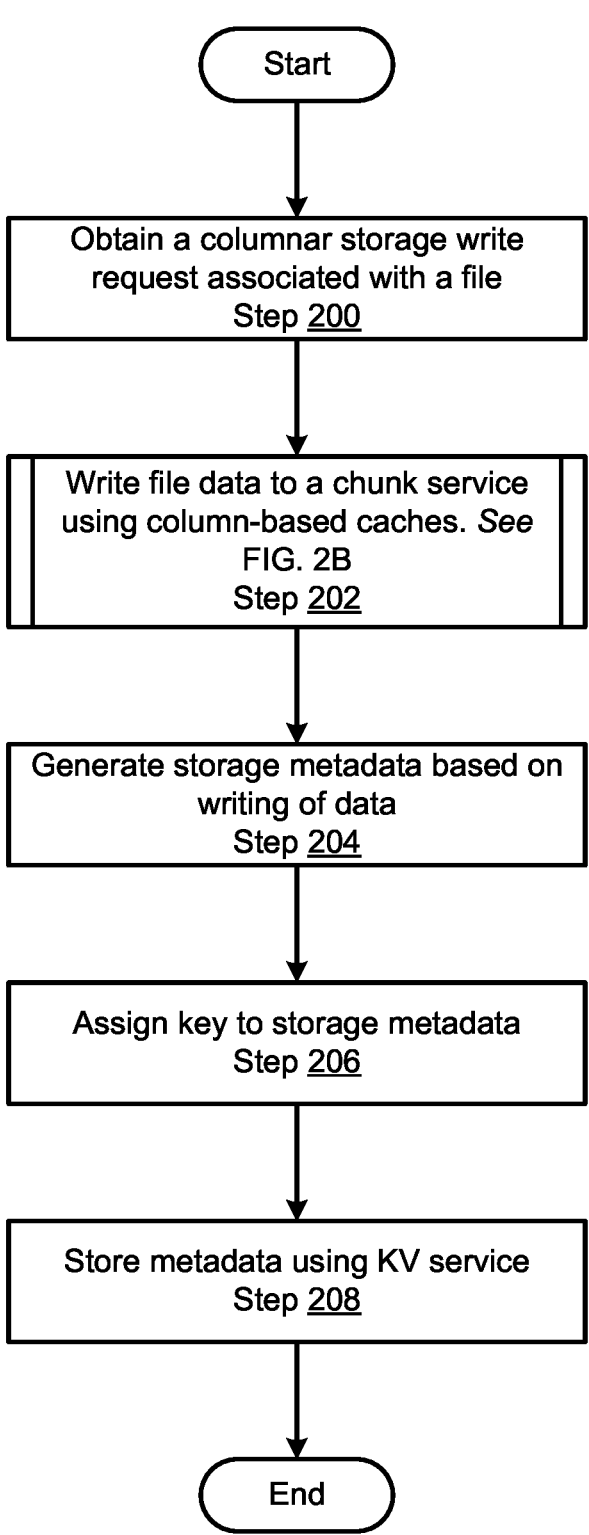
FIG. 2A shows a flowchart of a method for servicing a write request to a columnar storage in accordance with one or more embodiments disclosed herein.

FIG. 2A shows a flowchart of a method for servicing a write request to a columnar storage in accordance with one or more embodiments disclosed herein. The method shown in FIG. 2A may be performed by, for example, a columnar storage (e.g., 110, FIG. 1A). Other components of the system in FIGS. 1A-1B may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a columnar storage write request associated with a file is obtained. In one or more embodiments, the columnar storage may obtain a request to write a file to the columnar storage from the client or a user of the client. The request may be obtained by the columnar storage client of the columnar storage. In one or more embodiments, the request may include the file or specify the location of the file that may be used by the columnar storage to obtain the file. The request may further include the file name associated with the file. The request may include other and/or additional information without departing from embodiments disclosed herein. The request may be obtained using any appropriate method of data transmission without departing from embodiments disclosed herein. For example, in one embodiment, the request may be sent to the columnar storage as a message that includes one or more network packets through one or more network devices (e.g., network switches) that connect the client to the columnar storage. In another embodiment, the user may submit the request directly to the columnar storage via a user interface (e.g., a graphical user interface, a command-line interface, a web page interface, etc.). The columnar storage write request associated with the file may be obtained via other and/or additional methods without departing from embodiments disclosed herein.

In Step 202, file data is written to a chunk service using column-based caches. In one or more embodiments, the columnar storage client may initiate the writing of the file to the storages of the columnar storage. The columnar storage client may submit a request to the format handler. The request may specify the file. In response to obtaining the request, the format handler may begin writing the data of the file to the storages using column-based caches. File data may be written to the chunk service using column-based caches via the method discussed in FIG. 2B. For additional information regarding writing file data to the chunk service using column-based caches, refer to FIG. 2B.

In Step 204, file metadata is generated based on the writing of the data. In one or more embodiments, as discussed below in FIG. 2B, the format handler may generate page metadata associated with each page written to the storage. The format handler may generate the file metadata by including the page metadata associated with each page written during the method of FIG. 2B. The file metadata may refer to one or more data structures that include information associated with the file. The file metadata may be implemented as, for example, a separate file (e.g., a JavaScript Object Notation (JSON) file). In one or more embodiments, the information included in the file metadata may include the page metadata (discussed below in para. [0060]). The file metadata may further include the file name associated with the file, the key-value pair associated with the file metadata, the file type associated with the file, the number of rows and/or row groups (e.g., batches of sequential rows), column identifiers associated with the columns of the file, file size (e.g., compressed and/or uncompressed), and/or a column index specifying the pages and the corresponding page metadata associated with each column. The file metadata may include other and/or additional information associated with the file without departing from embodiments disclosed herein. The file metadata may be generated via other and/or additional methods without departing from embodiments disclosed herein.

In Step 206, a key is assigned to the file metadata. In one or more embodiments, the format handler may assign a key to the file metadata. In one or more embodiments, the format handler may assign the file name as the key for the file metadata. For example, the assigned key may be "file-_name.json". The file name may be specified in the write request obtained in Step 200. The format handler may assign another key (e.g., a user specified key included in/with the write request, a random unused key, etc.) to the file metadata without departing from embodiments disclosed herein. The key may be assigned to the file metadata via other and/or additional methods without departing from embodiments disclosed herein.

In Step 208, the file metadata is stored with the key using the KV service. In one or more embodiments, the format handler may send the file metadata and the assigned key to the KV service. The KV service may store the key and the file metadata as an associated key-value pair in the KV store as discussed above. As a result, the KV store may be used to retrieve the file metadata associated with the file to query and/or obtain all, or a portion, of the file data in the storages. The file metadata may be stored with the key using the KV service via other and/or additional methods without departing from embodiments disclosed herein.

In one or more embodiments disclosed herein, the method ends following Step 208.

Figure 2B:
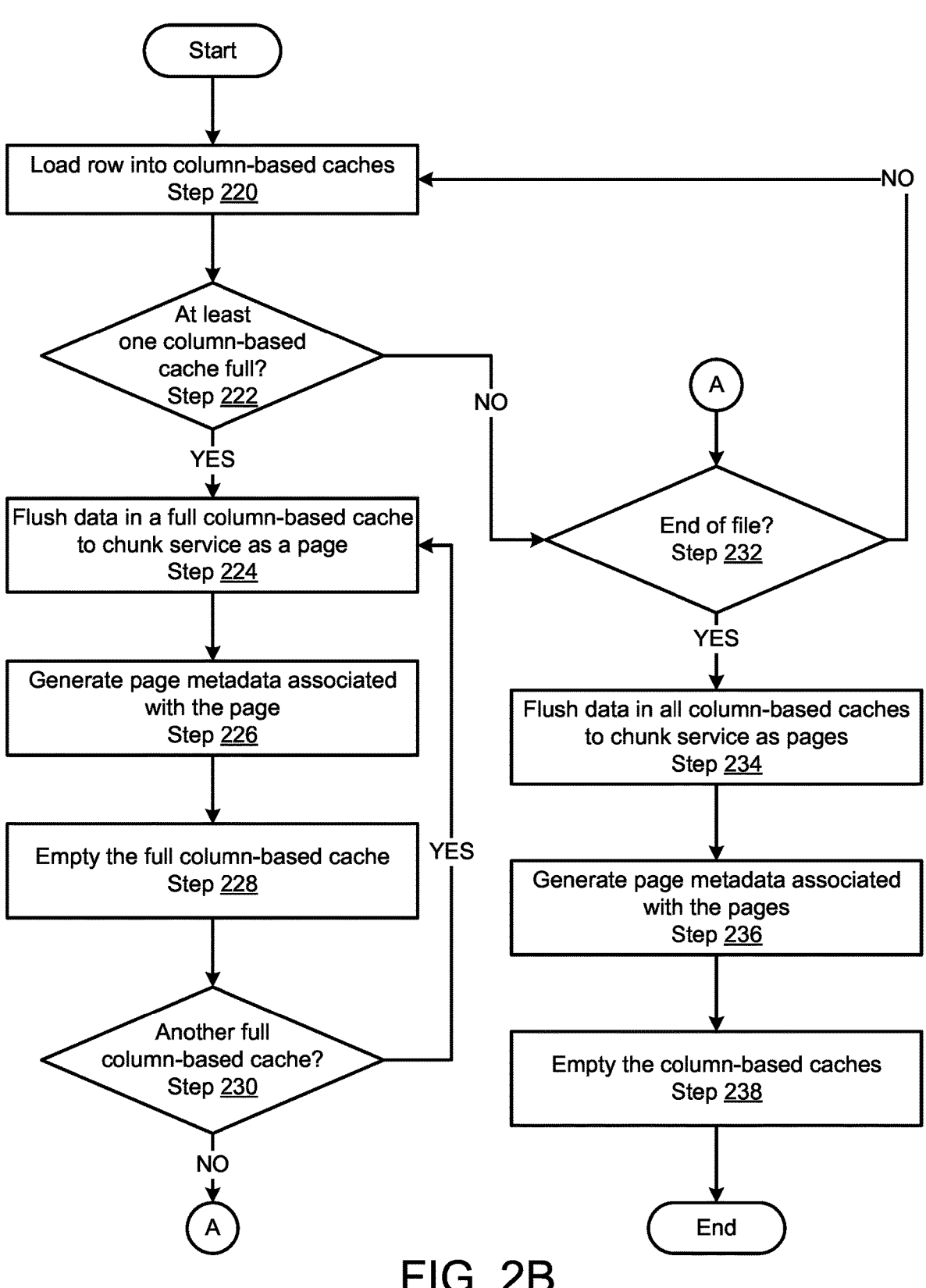
FIG. 2B shows a flowchart of a method for writing data to columnar storage in accordance with one or more embodiments disclosed herein.

FIG. 2B shows a flowchart of a method for writing data to columnar storage in accordance with one or more embodiments disclosed herein. The method shown in FIG. 2B may be performed by, for example, a columnar storage (e.g., 110, FIG. 1A). Other components of the system in FIGS. 1A-1B may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a row of the file is loaded into the column-based caches. In one or more embodiments, the format handler may load a row of file data in the CBCs. As discussed above, the CBCs may include multiple caches. A file may include multiple rows and columns. Each CBC of the CBCs may be associated with a particular column of the file. When a row is loaded into the CBCs, each column's data is loaded into the corresponding CBC. As a simple example, consider a file with two columns, column A and column B. Each row in the file may include column A data and column B data. Accordingly, when the format handler loads a row of the file data into the CBCs, the format handler may load column A data of the row into a first CBC and column B data of the row into a second CBC. The format handler may write rows to the CBCs in row order, starting with the first row at the top of the file and moving to the next row until the end of the file is reached (e.g., the last row of the file is loaded into the CBCs). The row of the file may be loaded into the CBCs via other and/or additional methods without departing from embodiments disclosed herein.

In Step 222, a determination is made as to whether at least one column-based cache is full. Because the data values of each column may be different sizes, each CBC column may be filled after different amounts of row data are loaded into the CBCs. Said another way, each CBC may be filled at different times in the row loading process. Each CBC may be treated independently by the format handler. When one CBC is full, the format handler may flush the data of the full CBC without waiting for the other CBCs to be filled. As a result, file data may be written concurrently to the storages of the columnar storage, thereby improving the performance and efficiency of writes of data to the columnar storage.

In one or more embodiments, the format handler may monitor each CBC of the CBCs. In one embodiment, each CBC may be associated with a cache threshold. The cache threshold may specify a quantity of data, that if exceeded after a row is loaded into the CBCs, the cache may be deemed full. The cache threshold may be a percentage of the total capacity of the cache (e.g., 90%) to allow for entire column data to be loaded to avoid hitting the maximum cache limit before the entirety of the column data is loaded into the cache. Each CBC may include the same and/or different cache thresholds (e.g., 1 MB). The format handler may monitor the contents of each CBC, and after each row is loaded into the CBCs, compare the amount of data each CBC to the cache threshold. In one or more embodiments, if the amount of data in a CBC of the CBCs exceeds the cache threshold, the format handler may determine that at least one CBC is full. In one or more embodiments, if the amount of data in all CBCs does not exceed the cache threshold, the format handler may determine that at least one CBC is not full.

In an alternative embodiment, each CBC may include a maximum capacity of data that the CBC may contain. Each CBC may include the same maximum capacity (e.g., 1 MB). The format handler may attempt to load column data into each CBC, and may be prevented if the loading of the CBC would cause the CBC to exceed its maximum capacity. In one or more embodiments, if the format handler is prevented from loading row data into a CBC due to exceeding the maximum capacity, then the format handler may determine that at least one CBC is full. In one or more embodiments, if the format handler is not prevented from loading row data into a CBC due to exceeding the maximum capacity, then the format handler may determine that at least one CBC is not full. The determination as to whether at least one CBC is full may be made via other and/or additional methods without departing from embodiments disclosed herein.

In one or more embodiments disclosed herein, if it is determined that at least one column-based cache is full, then the method proceeds to Step 224. In one or more embodiments disclosed herein, if it is determined that at least one column-based cache is not full, then the method proceeds to Step 232.

In Step 224, data in a full column-based cache is flushed to a chunk service as a page. In one or more embodiments, the format handler may flush a full CBC by writing the data in the full CBC to the chunk service. In one or more embodiments, the data may be written to the chunk service as a data block. The chunks service may assign a chunk identifier to the data block and store the data block in a storage as a page. As used herein, a page may refer to the logical unit of data written to the storage. A page may include the entirety of a data block flushed from a full CBC. The data in a full CBC may be flushed to the storage as a page via other and/or additional methods without departing from embodiments disclosed herein.

In Step 226, page metadata associated with the page is generated. In one or more embodiments, the chunk service may provide the chunk identifier and the storage location of the page stored in the storage. The storage location may include, for example, a storage identifier associated with the storage in which the data of the page is stored, one or more physical addresses associated with data of the page, and/or offsets (e.g., relative offset of data within the page). The storage location may include other and/or additional information without departing from embodiments disclosed herein. The format handler may also generate (e.g., prior to flushing data from the CBC) and/or obtain (e.g., from the chunk service) other properties associated with the page, such as the minimum and/or maximum data values included in the page, the total page size (e.g., compressed and/or uncompressed), etc. The format handler may include the above information in the page metadata associated with the page. The page metadata may include other and/or additional types of information associated with the page without departing from embodiments disclosed herein. The page metadata associated with the page may be generated via other and/or additional methods without departing from embodiments disclosed herein.

In Step 228, the full column-based cache is emptied. In one or more embodiments, the format handler clears the full CBC. The format handler may, for example, delete or otherwise remove the data in the CBC, overwrite the data in the CBC to default values, etc. The format handler may use any appropriate method for clearing a cache to clear the full CBC without departing from embodiments disclosed herein. The full CBC may be emptied via other and/or additional methods without departing from embodiments disclosed herein.

In Step 230, a determination is made as to whether there is another full column-based cache. In one or more embodiments, more than one CBC may be determined to be full after a row is loaded into the CBCs. The format handler may track full CBCs using any appropriate method of full cache tracking (e.g., generating a list of full CBCs, flagging full CBCs, tagging full CBCs, etc.). The format handler may denote full CBCs that have been flushed and emptied (e.g., by removing the CBC from the list of full CBCs or removing the flag/tag). The format handler may check to see if there is another full CBC specified by full CBCs list or flags/tags. In one or more embodiments, if there is another full CBC specified by the full CBC list or flags/tags, then the format handler may determine that there is another full CBC. In one or more embodiments, if there is not another full CBC specified by the full CBC list or flags/tags, then the format handler may determine that there is not another full CBC. The determination as to whether there is another full CBC may be made via other and/or additional methods without departing from embodiments disclosed herein.

In one or more embodiments disclosed herein, if it is determined that there is another full column-based, then the method proceeds to Step 224. In one or more embodiments disclosed herein, if it is determined that there is not another full column-based, then the method proceeds to Step 232.

In Step 232, a determination is made as to whether it is the end of the file. In one or more embodiments, the format handler may determine that the end of the file is reached if there are no more rows in the file that have not already been written or if the format handler identifies an end-of-file indicator. An end-of-file indicator may refer to specific character, bit, etc. used to denote the end of a file. In one or more embodiments, if the format handler has no more rows to load into the CBCs or identifies an end-of-file indicator, then the format handler may determine that it is the end of the file. In one or more embodiments, if the format handler has more rows to load into the CBCs or does not identify an end-of-file indicator, then the format handler may determine that it is not the end of the file. The determination as to whether it is the end of the file may be made via other and/or additional methods without departing from embodiments disclosed herein.

In one or more embodiments disclosed herein, if it is determined that it is the end of the file, then the method proceeds to step 234. In one or more embodiments disclosed herein, if it is determined that it is not the end of the file, then the method proceeds to step 220.

In Step 234, the data in all column-based caches are flushed to the chunk service as pages. In one or more embodiments, the format handler may flush all CBCs that include data, regardless if they are full, by writing the data in the CBCs to the chunk service. In one or more embodiments, the data may be written to the chunk service as data blocks. The chunks service may assign a chunk identifier to each data block and store the data blocks in a storage as pages. The data in all CBCs may be flushed to the storage as pages via other and/or additional methods without departing from embodiments disclosed herein.

In Step 236, page metadata associated with the pages is generated. In one or more embodiments, the chunk service may provide the chunk identifier and the storage location of each page stored in the storage. As discussed above, the storage location may include, for example, a storage identifier associated with the storage in which the data of the page is stored, one or more physical addresses associated with data of the page, and/or offsets (e.g., relative offset of data within the page). The storage location may include other and/or additional information without departing from embodiments disclosed herein. The format handler may also generate (e.g., prior to flushing data from the CBC) and/or obtain (e.g., from the chunk service) other properties associated with the pages, such as the minimum and/or maximum data values included in the pages, the total page sizes (e.g., compressed and/or uncompressed), etc. The format handler may include the above information in the page metadata associated with the pages. The page metadata may include other and/or additional types of information associated with the pages without departing from embodiments disclosed herein. The page metadata associated with the pages may be generated via other and/or additional methods without departing from embodiments disclosed herein.

In Step 238, the column-based caches are emptied. In one or more embodiments, the format handler empties the CBCs by clearing the CBCs that include data. The format handler may, for example, delete or otherwise remove the data in the CBCs, overwrite the data in the CBCs to default values, etc. The format handler may use any appropriate method for clearing a cache to clear the CBCs without departing from embodiments disclosed herein. The CBCs may be emptied via other and/or additional methods without departing from embodiments disclosed herein.

In one or more embodiments disclosed herein, the method ends following Step 238.

Figure 3:
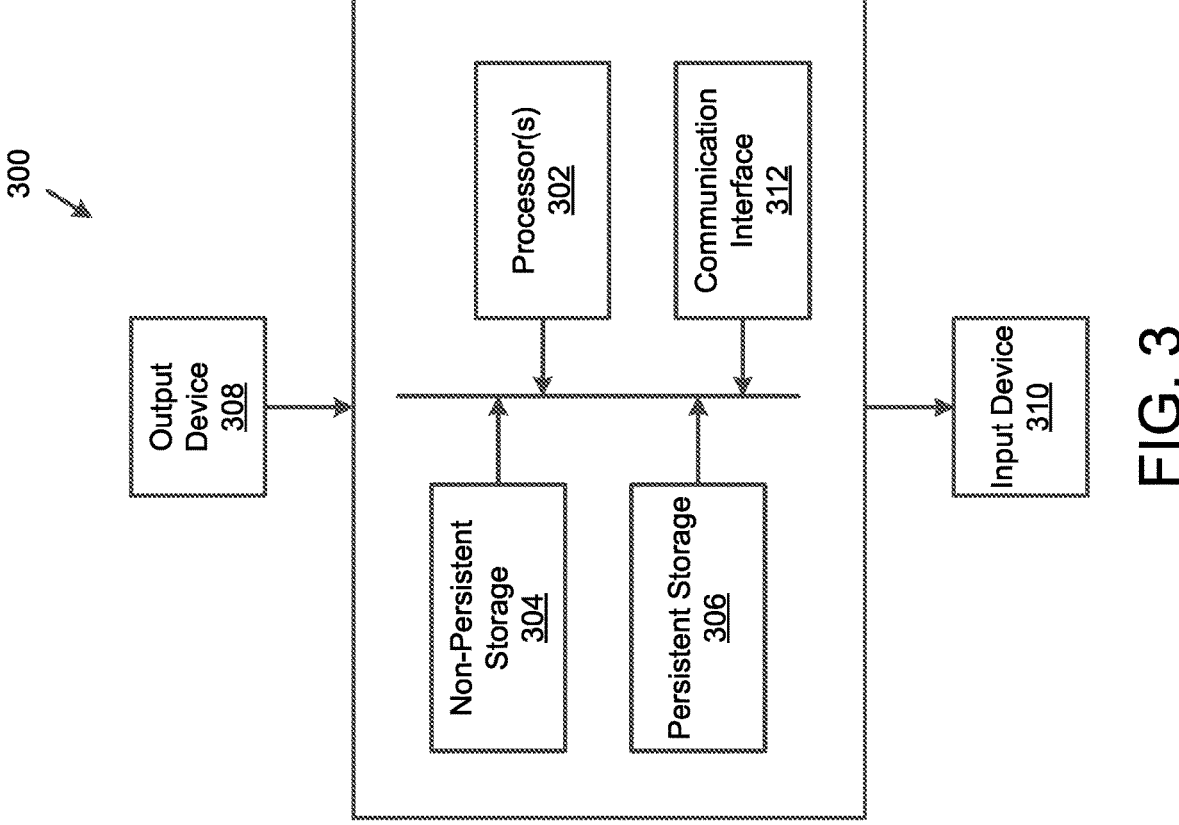
FIG. 3 shows a diagram of a computing device in accordance with one or more embodiments disclosed herein.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for storing data in columnar storage, comprising:

obtaining a columnar storage write request associated with a file, wherein the file comprises rows and columns of file data;

in response to obtaining the columnar storage write request:

writing the file data to storage using column-based caches, wherein writing the file data to the storage comprises:

loading row data associated with a first column of the file into a first column-based cache of the column-based caches;

loading row data associated with a second column of the file into a second column-based cache of the column-based caches;

making a determination that the first column-based cache is full, wherein the determination is made based upon a predetermined cache threshold, wherein the predetermined cache threshold is a percentage of the first column-based cache's total capacity, wherein each column-based cache of the column-based caches has a different capacity and a different cache threshold;

in response to the determination:

flushing the data in the first column-based cache to the storage as a first page;

generating first page metadata associated with the first page, wherein the first page metadata comprises a storage location of the first page, wherein the storage location comprises a storage identifier associated with the storage, and one or more physical addresses associated with data of the first page; and emptying the first column-based cache;

loading second row data associated with the first column of the file into the first column-based cache of the column-based caches;

loading second row data associated with the second column of the file into the second column-based cache of the column-based caches;

making a second determination that the second column-based cache and the first column-based cache are full;

in response to the second determination:

flushing the data in the second column-based cache to the storage as a second page;

generating second page metadata associated with the second page;

emptying the second column-based cache;

flushing the data in the first column-based cache to the storage as a third page;

generating third page metadata associated with the third page; and emptying the first column-based cache;

generating file metadata based on the writing of the file data to the storage; and assigning a key to the file metadata; and storing the file metadata using a key-value service.

2. The method of claim 1, wherein writing the file data to storage using the column-based caches further comprises:

after emptying the first column-based cache:

loading third row data associated with the first column of the file into the first column-based cache of the column-based caches;

loading third row data associated with the second column of the file into the second column-based cache of the column-based caches;

making a third determination that the second column-based cache is full;

in response to the third determination:

flushing the data in the second column-based cache to the storage as a fourth page;

generating fourth page metadata associated with the fourth page; and emptying the second column-based cache.

3. The method of claim 1, wherein the flushing of the data in the second column-based cache to the storage as a second page and the flushing of the data in the first column-based cache to the storage as a third page are performed concurrently.

4. The method of claim 1, wherein the file metadata comprises:

the first page metadata;

the second page metadata; and the third page metadata.

5. A system for storing data in columnar storage, comprising:

storage for storing data; and a format handler, comprising a processor and memory, and programmed to:

obtain a columnar storage write request associated with a file, wherein the file comprises rows and columns of file data;

in response to obtaining the columnar storage write request:

write the file data to storage using column-based caches, wherein writing the file data to the storage comprises:

loading row data associated with a first column of the file into a first column-based cache of the column-based caches;

loading row data associated with a second column of the file into a second column-based cache of the column-based caches;

making a determination that the first column-based cache is full, wherein the determination is made based upon a predetermined cache threshold, wherein the predetermined cache threshold is a percentage of the first column-based cache's total capacity, wherein each column-based cache of the column-based caches has a different capacity and a different cache threshold;

in response to the determination:

flushing the data in the first column-based cache to the storage as a first page;

generating first page metadata associated with the first page, wherein the first page metadata comprises a storage location of the first page, wherein the storage location comprises a storage identifier associated with the storage, and one or more physical addresses associated with data of the first page; and emptying the first column-based cache;

loading second row data associated with the first column of the file into the first column-based cache of the column-based caches;

loading second row data associated with the second column of the file into the second column-based cache of the column-based caches;

making a second determination that the second column-based cache and the first column-based cache are full;

in response to the second determination:

flushing the data in the second column-based cache to the storage as a second page;

generating second page metadata associated with the second page;

emptying the second column-based cache;

flushing the data in the first column-based cache to the storage as a third page;

generating third page metadata associated with the third page; and emptying the first column-based cache;

generate file metadata based on the writing of the file data to the storage; and assign a key to the file metadata; and store the file metadata using a key-value service.

6. The system of claim 5, wherein writing the file data to storage using the column-based caches further comprises:

after emptying the first column-based cache:

loading third row data associated with the first column of the file into the first column-based cache of the column-based caches;

loading third row data associated with the second column of the file into the second column-based cache of the column-based caches;

making a third determination that the second column-based cache is full;

in response to the third determination:

flushing the data in the second column-based cache to the storage as a fourth page;

generating fourth page metadata associated with the fourth page; and emptying the second column-based cache.

7. The system of claim 5, wherein the flushing of the data in the second column-based cache to the storage as a second page and the flushing of the data in the first column-based cache to the storage as a third page are performed concurrently.

8. The system of claim 5, wherein the file metadata comprises:

the first page metadata;

the second page metadata; and the third page metadata.

\* \* \* \* \*